United States Patent
Boyle et al.

(10) Patent No.: US 6,293,798 B1
(45) Date of Patent: Sep. 25, 2001

(54) SYSTEM AND METHOD FOR AN RC CONTROLLER AND SOFTWARE

(75) Inventors: Brendan J. Boyle, Palo Alto; Jeff Grant, Menlo Park; Steven J. Olefsky, Palo Alto, all of CA (US)

(73) Assignee: Skyline Products, Palo Alto, CA (US)

( * ) Notice: Subject to any disclaimer, the term of this patent is extended or adjusted under 35 U.S.C. 154(b) by 0 days.

(21) Appl. No.: 09/660,729

(22) Filed: Sep. 13, 2000

Related U.S. Application Data (60) Provisional application No. 60/164,519, filed on Nov. 10, 1999.

(51) Int. Cl.[7] .............................. G09B 9/02; G09B 19/16
(52) U.S. Cl. ................................ 434/29; 434/62; 434/66; 434/365; 446/456
(58) Field of Search ................................ 434/29–33, 43, 434/44, 61–63, 65, 69, 307 R, 308, 365; 446/433, 437, 456, 466; 180/6.5, 22, 65.6, 167, 168; 246/5, 219, 393; 244/7 B, 48, 76, 81, 120; 701/2, 25; 700/28, 32, 168, 253, 255

(56) References Cited

U.S. PATENT DOCUMENTS

| | | | |
|---|---|---|---|
| 4,964,837 | * | 10/1990 | Collier .............................. 446/409 |
| 5,315,515 | * | 5/1994 | Schmitz ................................. 701/2 |
| 5,377,439 | * | 1/1995 | Roos et al. ................................ 43/3 |
| 5,555,019 | * | 9/1996 | Dole ..................................... 348/148 |
| 5,663,879 | * | 9/1997 | Trovato et al. .......................... 701/2 |
| 5,752,880 | * | 5/1998 | Gabai et al. ............................. 463/1 |
| 5,785,576 | * | 7/1998 | Belton ................................. 446/456 |
| 5,995,884 | * | 11/1999 | Allen et al. ............................ 701/24 |
| 6,149,435 | * | 11/2000 | Park et al. ............................. 434/30 |

FOREIGN PATENT DOCUMENTS

| 2 219 873-A | * | 12/1989 | (GB) . |
| 9-16070-A | * | 1/1997 | (JP) . |
| 11-15405-A | * | 1/1999 | (JP) . |

* cited by examiner

*Primary Examiner*—Joe H. Cheng
(74) *Attorney, Agent, or Firm*—Carr & Ferrell, LLP (57) ABSTRACT

The present invention provides a system and method for a computer to perform a vehicle operation proficiency test and based upon the results, to transfer performance features upgrade data to a vehicle controller. The vehicle controller combines the functionality of an RC controller with that of a "joystick" within the same device by controlling an RC vehicle when used as an RC controller and controlling a computer virtual vehicle game when used as a "joystick."

22 Claims, 7 Drawing Sheets

SYSTEM AND METHOD FOR AN RC CONTROLLER AND SOFTWARE

CROSS REFERENCE TO RELATED APPLICATION

This application relates to and claims priority from commonly assigned U.S. Provisional Patent Application No. 60/164,519, filed on Nov. 10, 1999 and entitled, "A Car and Driver Toy" by Brendan J. Boyle and Jeff Grant, the disclosure of which is hereby incorporated by reference.

BACKGROUND OF THE INVENTION

1. Field of the Invention

This invention relates generally to radio controlled ("RC") car toys and computer virtual car games, and more particularly to a system and method for sending control data input to both using a single controller.

2. Description of the Background Art

Conventionally, RC cars and computer virtual car games use separate and non-interchangeable input devices. A radio controller for an RC car only works with the RC toy and not with a computer game. Similarly, a joystick or other computer input device only works with the computer virtual car game. Accordingly, a user cannot interchange the radio controller with the joystick and therefore the user must use two separate input devices.

Another problem with conventional RC car toys is that the user is limited to playing with the car during the daytime in order to see and accurately control the car. Further, in the event of inclement weather, such as rain or snow, the user would not be able to play with the RC car outside. Furthermore, playing indoors presents problems with limited space for maneuvering and speed, and the possibility of damage to interior furniture and/or to the car itself due to collisions.

Accordingly, during nighttime or inclement weather, the user may play with a computer virtual car game instead of with the RC car. However, because a different controller is used for the computer virtual car game, skills that are learned with the computer game are not easily transferred to the RC car toy, if at all.

Therefore, an improved radio controller and computer virtual car game are needed.

SUMMARY OF THE INVENTION

The present invention comprises a system and method for combining the functionality of an RC controller with the functionality of a joystick. In essence, the RC controller acts as an RC controller when used with an RC car, and acts as a "joystick" input device when used with a computer virtual car game. In the preferred embodiment of the invention, an RC car toy is used. However, any other controllable vehicle, for example, trucks, motorcycles, airplanes, boats, or helicopters, both real and virtual, can be substituted.

The present invention also permits a virtual car of the computer virtual car game and the RC car to both be customized to look as similar as possible. For example, a user can select and print racing decals and/or the user's name to attach to the RC car using a printer or other appropriate output device so as to match the appearance of the virtual car. Similarly, the user can use the computer virtual car game software to modify the virtual car's appearance to match the appearance of the RC car. Accordingly, the user experiences an interesting play experience since the virtual car onscreen can look identical to the RC car that he or she owns. The computer virtual car software program may also sense which "model" of RC car or vehicle that the user owns, and automatically display the matching model on the computer video output screen during operation of the computer virtual car game. Therefore, for example, if the user buys a red sports car, the computer virtual car game senses the red RC car and displays a virtual red sports car on the computer screen identical to the red RC car.

In addition, the virtual car game performs testing of the user in which the user practices skill sets in order to improve his or her operation of the RC car. Upon achieving pre-specified proficiency levels, the virtual car game unlocks certain features or removes limits that may be placed initially upon the virtual and/or RC car toy. For example, the RC car may start out with limited speed or capabilities. Through playing the virtual car game, the user may unlock abilities, such as increased maximum speed, of the RC car.

Accordingly, the invention provides an improved RC controller that is capable of sending input commands to both the RC car and virtual car game. Further, the invention provides virtual car game software that has the ability to sense a vehicle's model and match the appearances of the virtual car with the RC car.

DETAILED DESCRIPTION OF THE PREFERRED EMBODIMENT

The present invention provides a system and method for an RC controller to send control data input to an RC car and a corresponding computer virtual car game. The present invention also includes a system and method for skill improvement and transfer between the computer virtual car game and the RC car. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

Figure 1A:
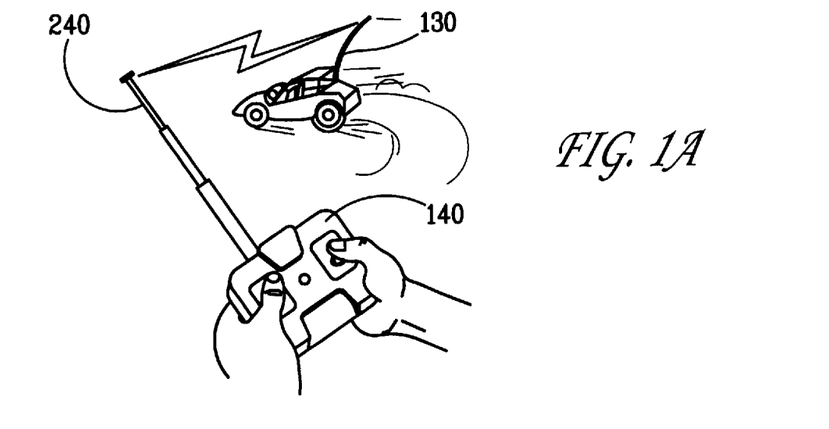
FIG. 1A is a perspective view of the RC controller with its radio frequency ("RF") antenna extended and sending input to an RC car.

FIG. 1A is a perspective view of the RC controller 140 with its RF antenna 240 extended and sending input to an RC car 130. The user controls the velocity of RC car 130 using input control 250 of RC controller 140, which in turn sends input control data to car 130 via RF antenna 240. Controller 140 will be discussed in further detail in conjunction with FIG. 2. Car 130 receives the input control data and adjusts velocity accordingly. In alternative embodiments of the invention, car 130 can be any controllable vehicle, such as an airplane, hovercraft, boat, etc.

Figure 1B:
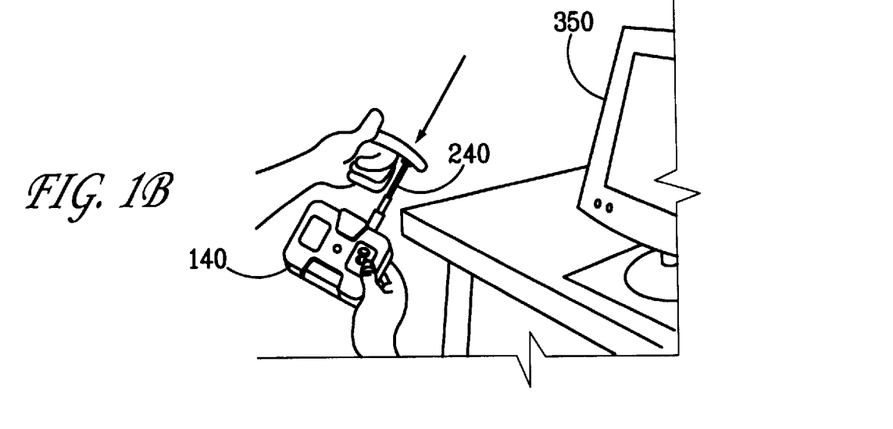
FIG. 1B is a perspective view of a user retracting the RF antenna of the RC controller.

FIG. 1B is a perspective view of a user retracting the antenna 240 of the RC controller 140. In this view, the user ends the play session with the physical RC car toy 130 and retracts antenna 240. The user may discontinue playing at this point, or the user may decide to switch the play session over to a computer virtual car game on computer 120.

Figure 1C:
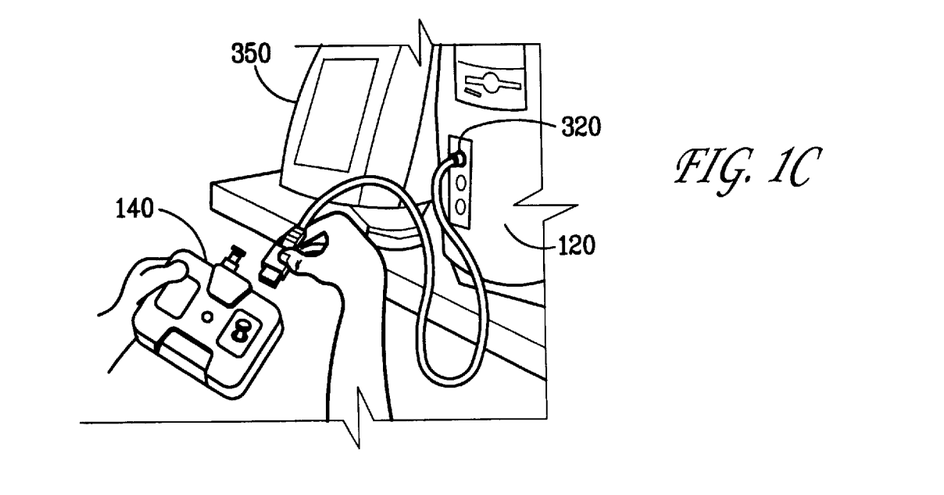
FIG. 1C is a perspective view of a user coupling the RC controller to a computer.

Referring now to FIG. 1C, a perspective view of a user coupling the RC controller 140 to a computer 120 is shown. The user couples the controller 140 to the computer 120 that will be used for the computer virtual car gaming session. The user plugs the controller into I/O interface 320 of computer 120 so that computer 120 can receive control data input from controller 140. However, in the preferred embodiment of the invention, controller 140 sends control input data via antenna 240, in which case the RF antenna 240 remains extended.

Figure 1D:
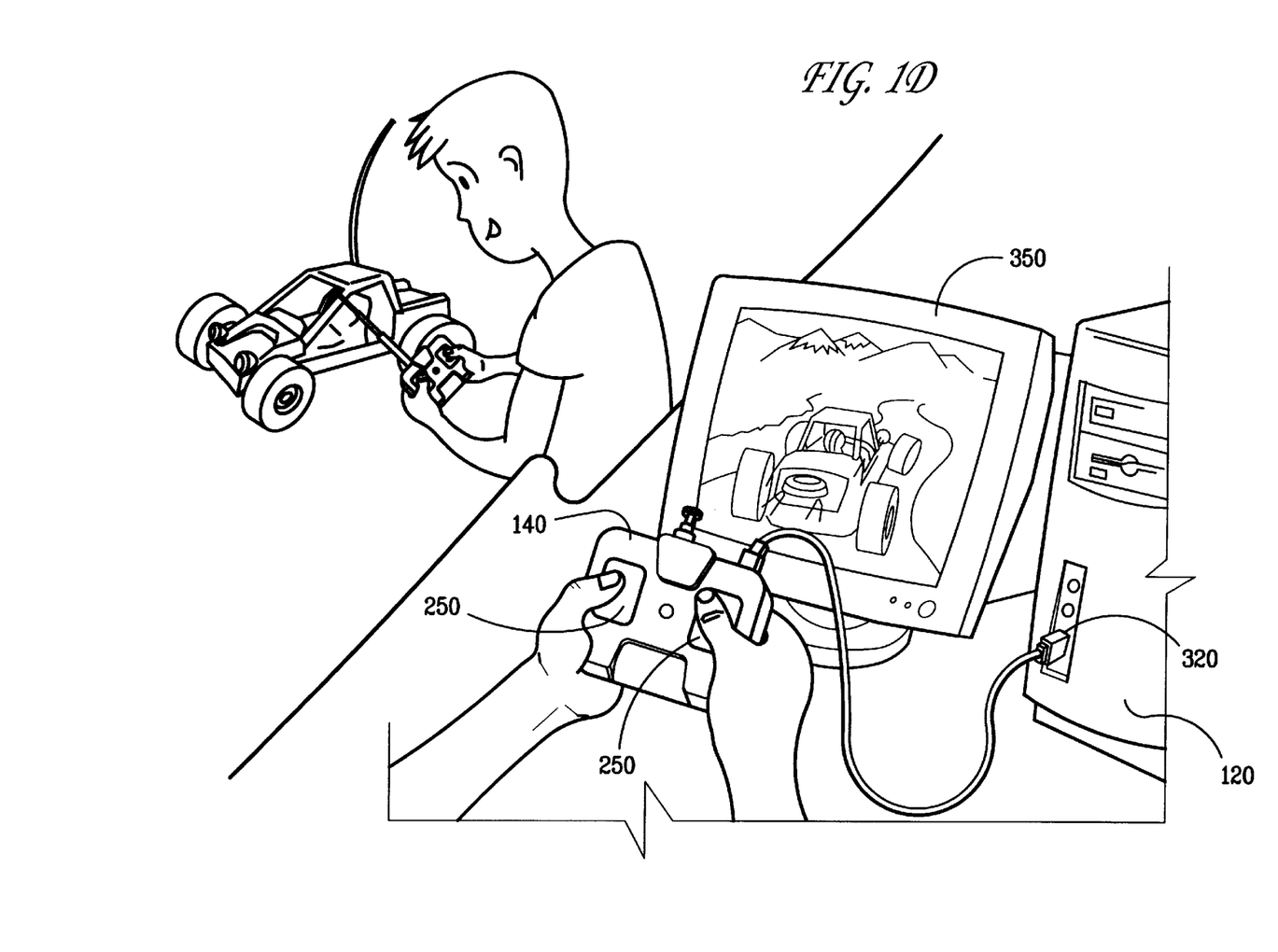
FIG. 1D is a perspective view of the RC controller when used with a computer virtual car game.

FIG. 1D is a perspective view of the RC controller 140 when used with a computer virtual car game on computer 120. In this view, a user is manipulating input controls 250 on the RC controller 140, which is coupled directly to computer 120 for the computer virtual car gaming session. RC controller, in turn, sends input data to computer 120 via I/O interface 320. Computer 120 displays a computer virtual car, whose model is identical to RC car 130, on monitor 350.

Figure 2:
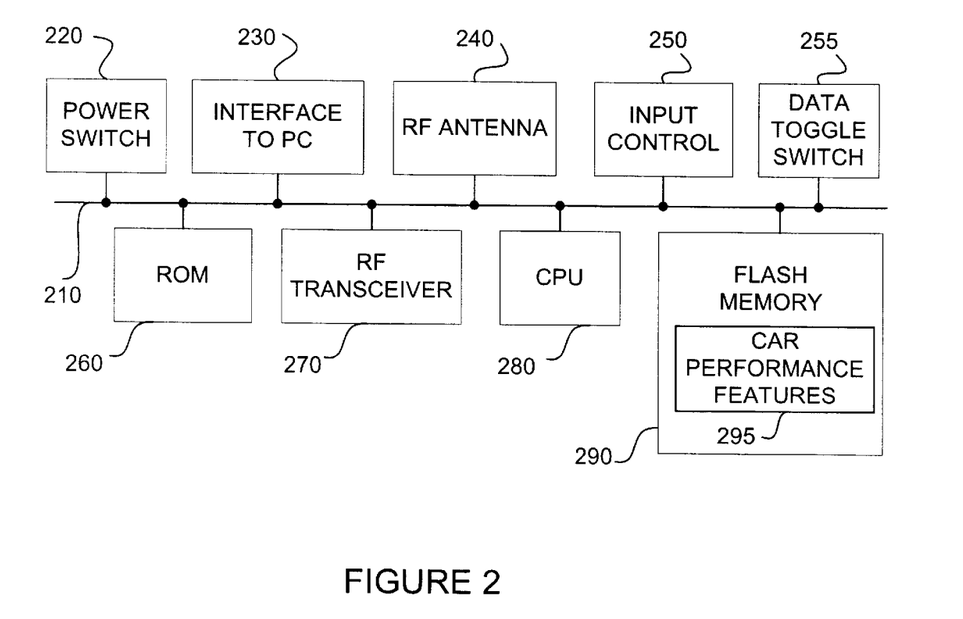
FIG. 2 is a block diagram of the RC controller components.

FIG. 2 is a block diagram of the RC controller 140 components. The RC controller 140 includes system bus 210, power switch 220, PC interface 230, an RF antenna 240, an input control 250, a data toggle switch 255, ROM 260, an RF transceiver 270, a central processing unit ("CPU") 280, and flash memory 290, all interconnected for communication via system bus 210. The power switch 220 is used to turn power on or off for the controller 140. The PC interface 230 provides connectivity between the RC controller 140 and computer 120. The RF antenna 240 sends and/or receives data between the controller 140 and RC car 130 or controller 140 and computer 120. Input control 250 accepts user control data input into controller 140. Input control 250 can be any type of input device such as a joystick, trackball, touchpad, keyboard, mouse, lightpen, microphone, or any device capable of generating positional signals responsive to user manipulation of the device or a combination thereof. The data toggle switch 255 toggles between sending data to RC car 130 and computer 120, depending upon user choice. The data toggle switch 255 setting prevents both RC car 130 and computer 120 from receiving control input instructions at the same time. ROM 260 stores executable instructions for analyzing and modifying user control data input per car features 295 data stored in flash memory 290. ROM 260 also stores the digital code for car model information for matching the virtual car viewed onscreen with the RC car 130. The car model digital code of the RC car 130 is sent to the computer 120 the first time the controller 140 is connected to computer 120.

During RC car 130 operation, the CPU 280 executes the instructions stored in ROM 260, which analyzes and modifies control data input according to the limitations set in car performance features 295. Flash memory 290 stores car performance features 295 data, even when RC controller 140 is turned off. RF transceiver 270 receives CPU 280-modified control data input and sends the modified data to RC car 130. In addition, in the preferred embodiment of the invention, RF transceiver 270, via antenna 240, sends control data input to computer 120. Operation of RC controller 140 will be discussed in further detail in conjunction with FIG. 6.

Figure 3:
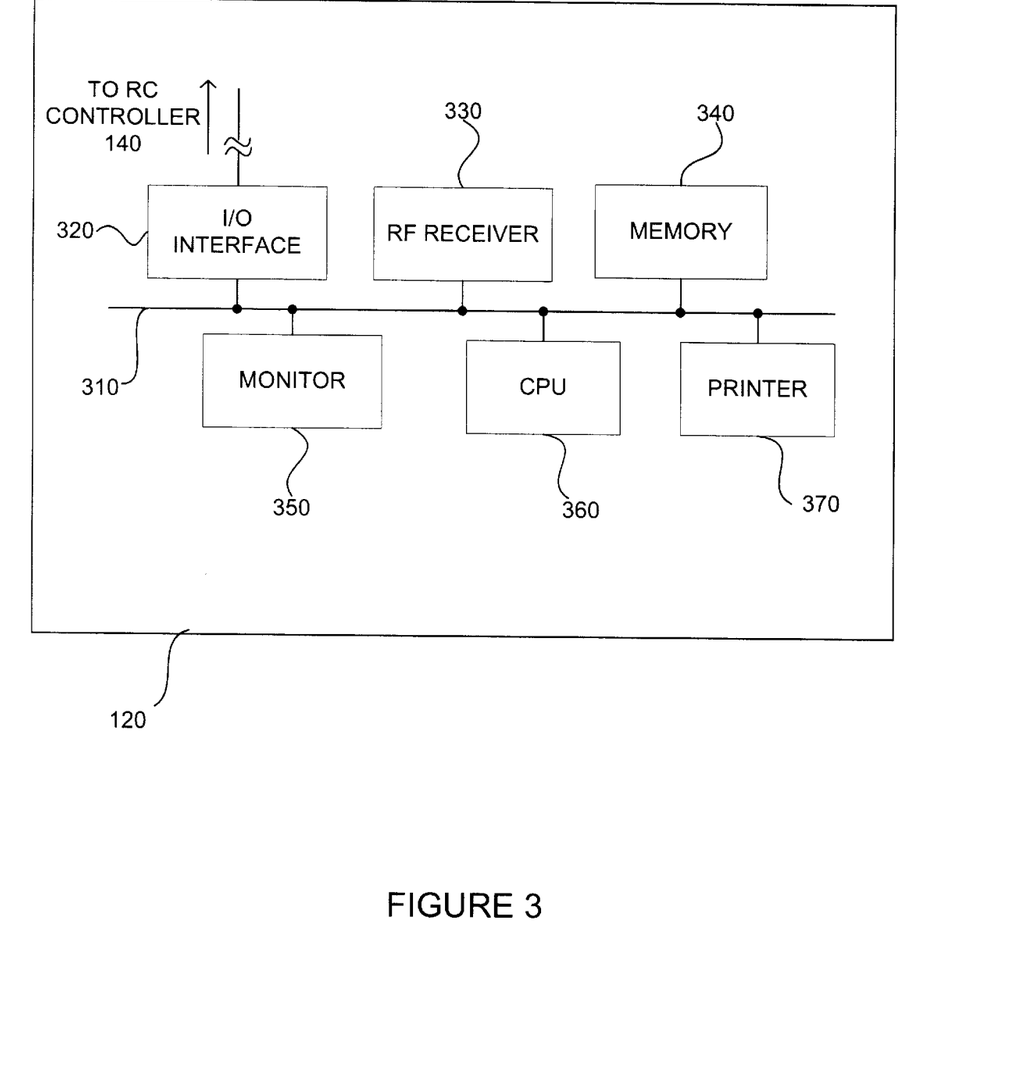
FIG. 3 is a block diagram of a computer suitable for implementing the computer virtual car game.

FIG. 3 is a block diagram of computer 120 and its components suitable for implementing the computer virtual car game. Computer 120 includes optional I/O interface 320, RF transceiver 330, memory 340, monitor 350, CPU 360, and optional printer 370, all interconnected for communication via system bus 310. Optional I/O interface 320 is a port on the computer 120 that sends and receives signals between the computer 120 and the controller 140 in the event that the controller 140 is directly coupled to the computer 120. I/O interface 320 may be a parallel port, serial port, universal serial bus ("USB") port, or any other port capable of transmitting data. However, in the preferred embodiment, RF transceiver 330 transmits and/or receives data between computer 120 and controller 140.

Memory 340 stores game software 420 (FIG. 4) and other computer 120 programs and applications from game software 420. Memory 340 will be discussed in further detail in conjunction with FIG. 4. Monitor 350 displays video output for presenting images to the user. Monitor 350 may comprise a cathode ray tube ("CRT"), a liquid crystal display ("LCD"), or any other suitable equivalent. CPU 360 executes game software 420 stored in memory 240. CPU 360 may comprise, for example, an Intel® Pentium® processor. Printer 370 prints decals for affixing to RC car 130.

Figure 4:
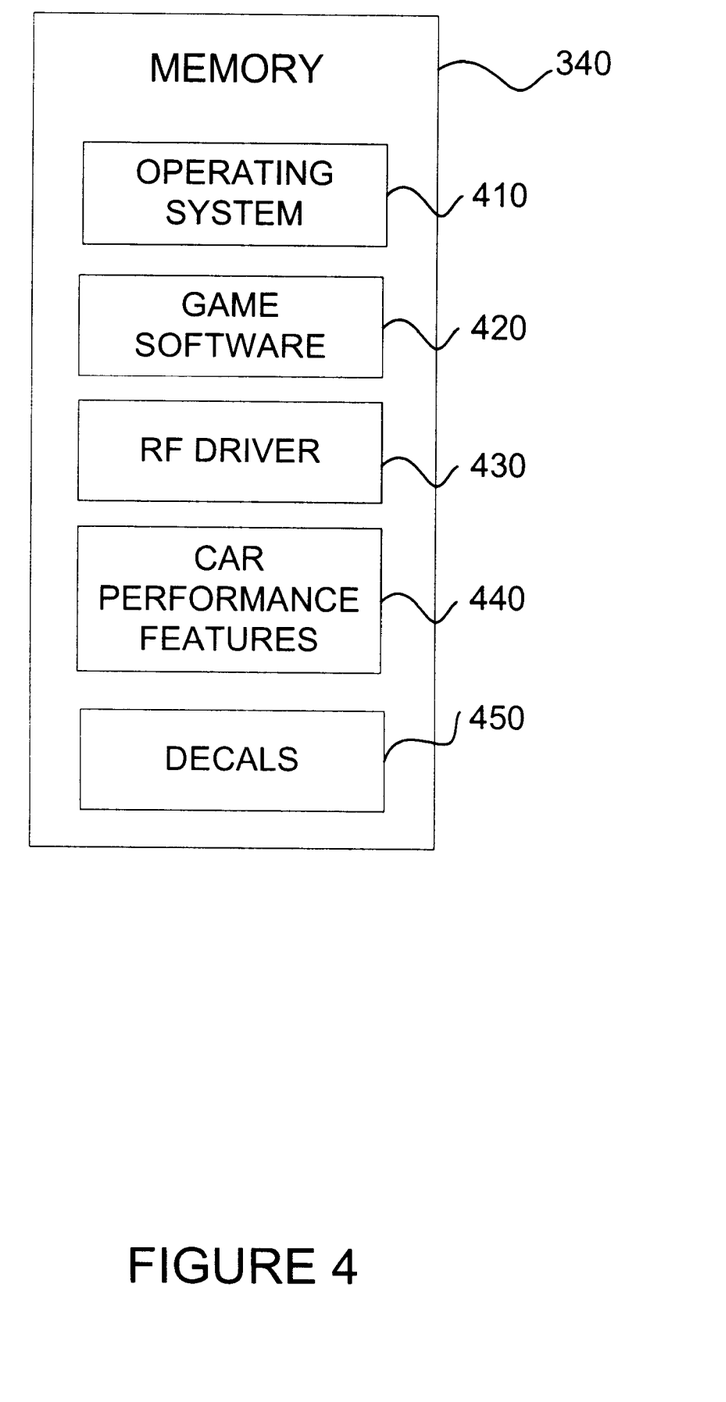
FIG. 4 is a block diagram of memory in the computer system shown in FIG. 3.

FIG. 4 is a block diagram of memory 340 in the computerstem 120 (FIG. 3). The memory 340 comprises an operating system ("OS") 410, game software 420, an RF driver 430, car performance features 440, and decals 450. The memory 340 may include volatile random access memory (RAM), non-volatile ROM, magnetic or optical disk drives such as hard drives or CD-ROM, or any appropriate combination of the foregoing or equivalents thereto. OS 410 may be Windows NT®, Windows 98®, Windows 95®, Linux, SunOS/Solaris, Apple Mac OS®, or any other operating system suitable for operating with game software 420. Game software 420 is a computer virtual car game and vehicle operation proficiency testing software and will be described in further detail in conjunction with FIG. 5. RF driver 430 extends the operating system 410 to support the RF transceiver 330 device. The car performance features 440 include RC car 130 performance limitations, such as maximum allowable velocity, for the computer RC car 130. The user can enhance learning and skill set proficiency in the virtual environment on computer 120 and can then employ these enhanced skills later on when playing with physical RC car 130. Decals 450 are the image files that match the RC car 130 and may be printed on printer 370 for application to RC car 130 in order to customize the appearance of RC car 130.

Figure 5:
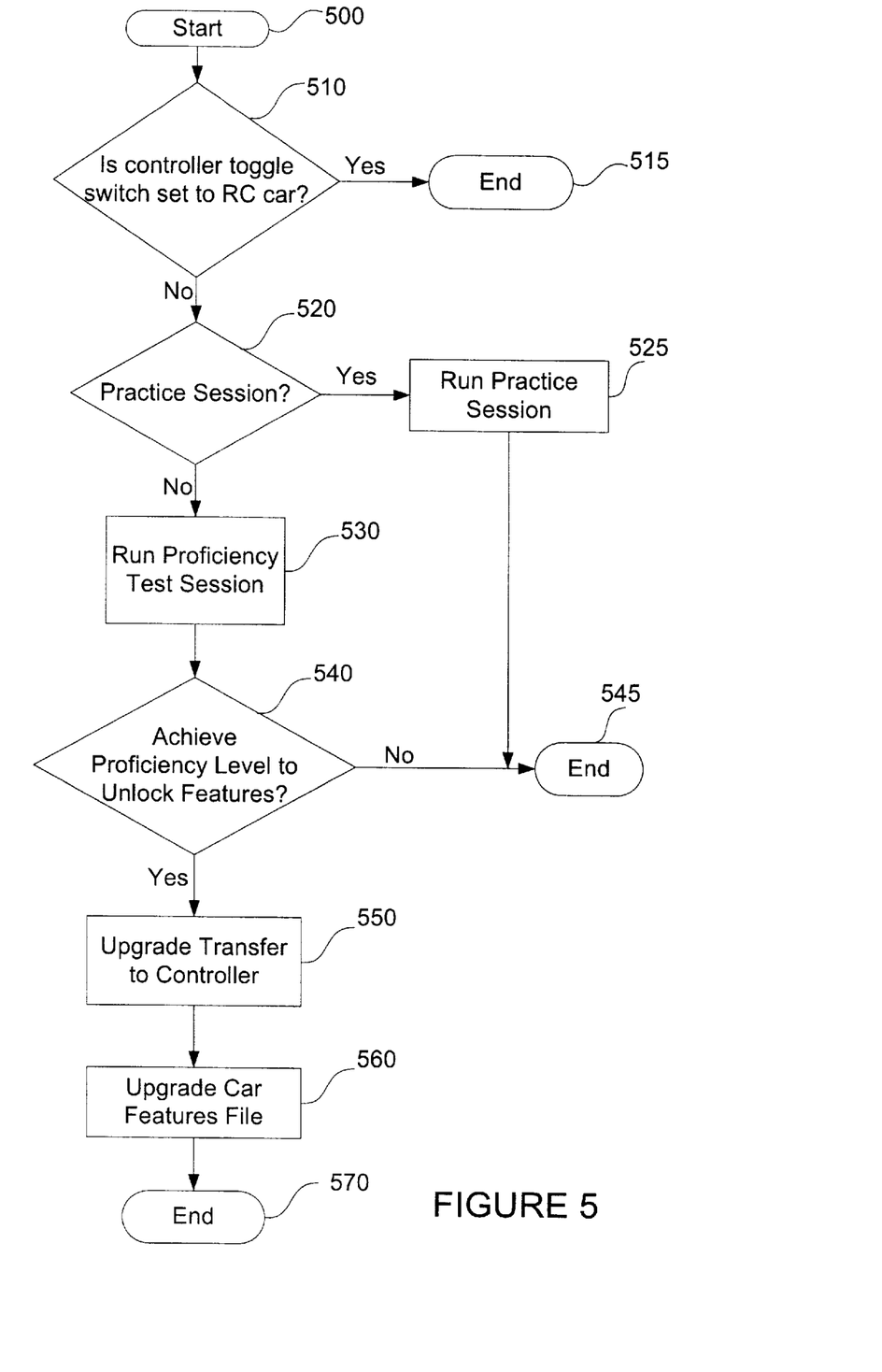
FIG. 5 is a flowchart of the method steps performed by the Computer Virtual car game.

FIG. 5 is a flowchart of the method steps performed by the computer virtual car game software 420. At step 500, the user starts the computer 120 gaming session. At step 510, the game software 420 determines whether the data toggle switch 255 is set to send data to RC car 130 or to computer 120. If the data toggle switch 255, which prevents both car 130 and computer 120 from receiving control input instructions at the same time, is currently set to send data to RC car 130, the game software 420 terminates the session at step 515.

If the game software 420 determines that data toggle switch 255 is set to send data to computer 120, then at step 520, game software 420 determines whether to run a practice session or a proficiency test session according to the user's choice. If game software 420 determines to run a practice session, then at step 525, game software 420 runs the practice on. At step 545, game software 420 terminates the session.

If, at step 520, game software 420 determines to run a proficiency test session according to the user's input, then, at step 530, game software 420 runs a proficiency test session to test the user's proficiency in operating a virtual car corresponding to RC car 130. The proficiency test session is based on parameters stored in car performance features 440 with the aim of decreasing limitation on RC car 130 operation imposed by the parameters.

After running the proficiency test session of step 530, game software 420 determines at step 540 whether the user has achieved the proper proficiency level to unlock features of car 130, such as maximum velocity, turning ability, etc. If the proper proficiency level has not been attained, then game software 420 terminates at step 545.

However, if at step 540 the user has achieved a desired level of proficiency for unlocking features or removing limits in car 130, then at step 550, the game software 420 unlocks a feature, such as maximum velocity, or removes a limit of car 130, and transfers this unlocking information to controller 140. Controller 140, in turn, updates car performance features 295 stored in flash memory 290. Next, at step 560, game software 420 updates car performance features 440. At step 570, the method ends.

Figure 6:
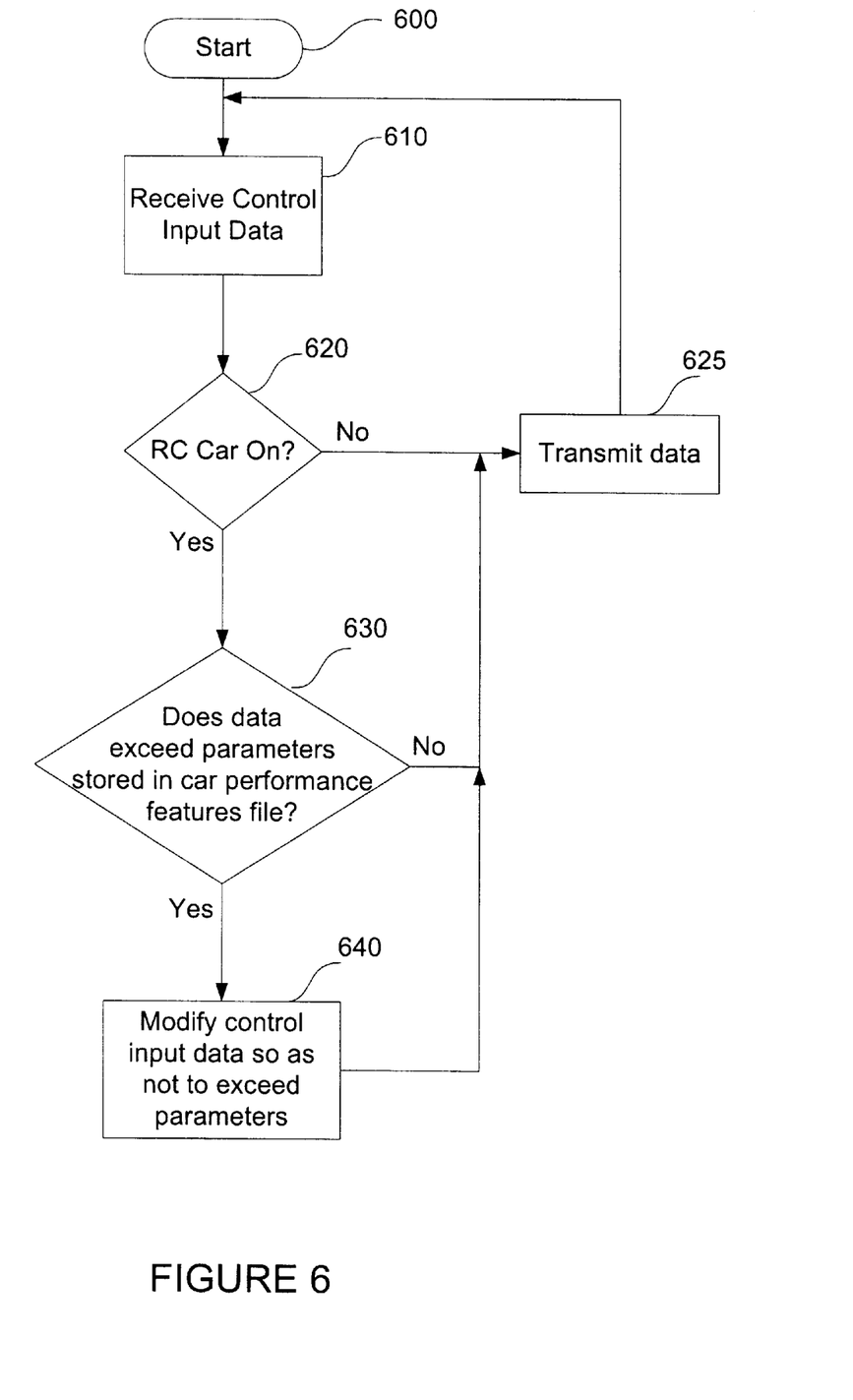
FIG. 6 is a flowchart of the method steps performed by instructions stored in read-only memory ("ROM") in the RC controller.

FIG. 6 is a flowchart of the method steps performed by the ROM 260 instructions in the RC controller 140 when a user inputs control data. At step 600, the method starts. At step 610, the ROM 260 of controller 140 receives control input data. At step 620, Rom 260 determines whether the RC car 130 is on. If the RC car 130 is not on, the ROM 260 transmits data at step 625 and the process loops back to step 610. If, at step 620, the ROM 260 determines that the RC car 130 is on, the method proceeds to step 630. At step 630, the ROM 260 determines whether the data exceeds the parameters that are stored in the car performance features 295 file. If the data does not exceed the parameters, the ROM 260 transmits data at step 625 and the process loops back to step 610. If the data does exceed the parameters stored in the car performance features 295 file, the method proceeds to step 640. At step 640, the ROM 260 modifies control input data so as not to exceed parameters. After step 640, the ROM 260 transmits data at step 625 and the process resumes again at step 610.

It is noted that other embodiments of the invention will be apparent to those skilled in the art upon review of this disclosure. Therefore, these and other variations upon the preferred embodiments are intended to be covered by the present invention.

What is claimed is:

1. A computer-readable medium for storing instructions for a computer to perform a radio controlled (RC) vehicle operation proficiency test, comprising:
   executing a proficiency test session to test a user's skill in operating a virtual vehicle corresponding to a RC vehicle;
   determining whether a proficiency level necessary to upgrade vehicle performance features has been achieved; and
   operative when the necessary proficiency level is achieved, transferring vehicle performance features upgrade data to a RC vehicle controller for controlling movement of the RC vehicle.

2. The computer-readable medium of claim 1 wherein the RC vehicle is a RC car.

3. The computer-readable medium of claim 2 wherein the RC controller is capable of exchanging data with both the computer and the RC vehicle.

4. The computer-readable medium of claim 1 wherein the RC controller can be temporarily coupled to the computer via a cable.

5. The computer-readable medium of claim 1 wherein the RC controller sends and receives data to and from the computer via a wireless connection.

6. The computer-readable medium of claim 1 further comprising the step of determining whether the RC vehicle is turned on or off.

7. The computer-readable medium of claim 1 further comprising the step of receiving vehicle identification data from the RC controller, the vehicle identification data indicating physical surface features of the RC vehicle.

8. The computer-readable medium of claim 7 further comprising displaying on a monitor a simulation of the RC vehicle with the physical surface features.

9. A method for a computer to perform a radio controlled (RC) vehicle operation proficiency test, comprising the steps of:
   executing a proficiency test session to test a user's proficiency in operating a virtual vehicle corresponding to a RC vehicle;
   determining whether a proficiency level necessary to upgrade vehicle performance features has been achieved; and
   operative when the necessary proficiency is achieved, transferring vehicle performance features upgrade data to a RC vehicle controller for controlling movement of the RC vehicle.

10. The method of claim 9 wherein the RC vehicle is a RC car.

11. The method of claim 9 wherein the RC controller is capable of exchanging data with both the computer and the RC vehicle.

12. The method of claim 9 wherein the RC controller can be temporarily coupled to the computer via a cable.

13. The method of claim 9 wherein the RC controller sends and receives data to and from the computer via a wireless connection.

14. The method of claim 9 further comprising the step of determining whether the RC vehicle is turned on or off.

15. The method of claim 9 further comprising the step of sensing which model of vehicle a user owns and thereby displaying a matching module on a monitor.

16. A radio controlled (RC) controller for use in operating a radio controlled (RC) vehicle, comprising
   an input device for inputting RC vehicle control data;
   memory for holding vehicle performance features data received form a computer;
   a CPU for analyzing and modifying the RC vehicle control data according to the vehicle performance features data; and
   a transceiver for transmitting modified RC vehicle control data to a RC vehicle, transmitting unmodified RC vehicle control data to the computer, and receiving vehicle performance features data from the computer.

17. The RC controller of claim 16 further comprising a retractable antenna coupled to the transceiver.

18. The RC controller of claim 16 wherein the memory is a flash memory.

19. The RC controller of claim 16 wherein the RC vehicle is a RC car.

20. The RC controller of claim 16 further comprising at least one PC Input/Output interface.

21. The RC controller of claim 20 wherein the input device comprises at least one joystick.

22. The RC controller of claim 16 wherein the RC controller functions to control the RC vehicle and a virtual vehicle on the computer.

\* \* \* \* \*